United States Patent
Roberto et al.

(10) Patent No.: US 12,425,767 B2
(45) Date of Patent: Sep. 23, 2025

(54) SELECTIVE ACOUSTIC OPTIMIZATION FOR THERMALLY OR POWER LIMITED SPEAKER SYSTEMS

(71) Applicant: Cirrus Logic International Semiconductor Ltd., Edinburgh (GB)

(72) Inventors: Miles K. Roberto, Austin, TX (US); Chris Rattray, Newbury (GB); Zhengyi Xu, Fleet (GB); Philip B.J. Clarkin, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 17/735,419

(22) Filed: May 3, 2022

(65) Prior Publication Data
US 2023/0199384 A1   Jun. 22, 2023

Related U.S. Application Data

(60) Provisional application No. 63/292,172, filed on Dec. 21, 2021.

(51) Int. Cl.
| | |
|---|---|
| *H04R 3/00* | (2006.01) |
| *G01K 3/10* | (2006.01) |
| *H04R 3/04* | (2006.01) |
| *H04R 29/00* | (2006.01) |

(52) U.S. Cl.
CPC ............ *H04R 3/007* (2013.01); *G01K 3/10* (2013.01); *H04R 3/04* (2013.01); *H04R 29/001* (2013.01); *H04R 2430/01* (2013.01)

(58) Field of Classification Search
CPC ..................................................... H04R 3/007
See application file for complete search history.

(56) References Cited

U.S. PATENT DOCUMENTS

| | | | |
|---|---|---|---|
| 10,356,522 B2 | 7/2019 | Lawrence et al. | |
| 11,228,284 B2* | 1/2022 | Lindemann | G01R 27/2611 |
| 11,496,848 B2* | 11/2022 | Lehnert | H03G 3/3005 |
| 11,677,360 B2* | 6/2023 | Yin | H03G 5/005 |
| | | | 381/59 |
| 2013/0077794 A1 | 3/2013 | Risbo et al. | |
| 2018/0213322 A1* | 7/2018 | Napoli | G10L 25/21 |
| 2018/0352329 A1 | 12/2018 | Klinger et al. | |
| 2023/0164510 A1* | 5/2023 | Uhlich | G11B 27/031 |
| | | | 381/302 |

FOREIGN PATENT DOCUMENTS

| | | |
|---|---|---|
| CN | 113099352 A | 7/2021 |
| WO | 2013187718 A1 | 12/2013 |

OTHER PUBLICATIONS

Machine translation of WO2013187718, 36 pages. (Year: 2013).*
International Search Report and Written Opinion of the International Searching Authority, International Application No. PCT/US2022/050397, mailed Mar. 27, 2023.

* cited by examiner

*Primary Examiner* — Ping Lee
(74) *Attorney, Agent, or Firm* — Jackson Walker L.L.P.

(57) ABSTRACT

A system may include a first input configured to receive a playback signal to be played back to a transducer, a second input configured to receive temperature information associated with the transducer, and a thermal-controlled gain element configured to determine a sub-band gain to be applied to a selected frequency band of the playback signal, wherein the thermal-controlled gain element determines the gain based on the temperature information and apply the sub-band gain to the selected frequency band.

14 Claims, 4 Drawing Sheets

SELECTIVE ACOUSTIC OPTIMIZATION FOR THERMALLY OR POWER LIMITED SPEAKER SYSTEMS

RELATED APPLICATION

The present disclosure claims priority to U.S. Provisional Patent Application Ser. No. 63/292,172, filed Dec. 21, 2021, which is incorporated by reference herein in its entirety.

FIELD OF DISCLOSURE

The present disclosure relates in general to acoustic optimization of acoustic speakers in thermally limited and/or power limited speaker systems.

BACKGROUND

Many audio systems, including those in mobile devices such as smart phones, utilize micro-speakers, on account of physical space constraints in such systems. Users of micro-speakers may often desire top-end loudness (e.g., maximum volume), maintaining timbre balance and audio dynamics, and significant presence of bass.

However, such desires often directly clash with a "thermal limiter bottleneck," which may occur as many audio systems include thermal protection for speakers, to prevent overheating and damage to speakers or devices including such speakers. Micro-speaker sensitivity may roll off steeply (e.g., at −12 dB/octave) below a resonant frequency of the micro-speaker. As a result, more power may be needed at bass frequencies in order to produce a desired sound pressure level. The desire for top-end loudness may be in direct opposition to the desire for bass, particularly when thermally limited.

A micro-speaker may be most efficient in its passband. Micro-speakers often have poor acoustical response, especially at low frequencies, due to relatively small surface area, low maximum displacement, and high resonant frequency. Bass frequencies may be boosted to respond to such limitations, but such boosting may decrease acoustic efficiency, drive up power consumption, and overheat a speaker.

Further, music often has a "pink" or 1/f spectrum (where f is playback frequency). Because micro-speakers may be most efficient in their passband region, most power driven to a micro-speaker may be in an acoustically inefficient region, especially when bass is boosted and the pass band is attenuated by an equalizer.

SUMMARY

In accordance with the teachings of the present disclosure, the disadvantages and problems associated with undesirable dynamics and thermal protection of a micro-speaker may be reduced or eliminated.

In accordance with embodiments of the present disclosure, a system may include a first input configured to receive a playback signal to be played back to a transducer, a second input configured to receive temperature information associated with the transducer, and a thermal-controlled gain element configured to determine a sub-band gain to be applied to a selected frequency band of the playback signal, wherein the thermal-controlled gain element determines the gain based on the temperature information and applies the sub-band gain to the selected frequency band.

In accordance with these and other embodiments of the present disclosure, a method may include determining based on temperature information associated with a transducer, a sub-band gain to be applied to a selected frequency band of a playback signal to be played back to the transducer, and applying the sub-band gain to the selected frequency band.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal will generally be an analog time varying voltage signal, for example, a time varying waveform.

Figure 1:
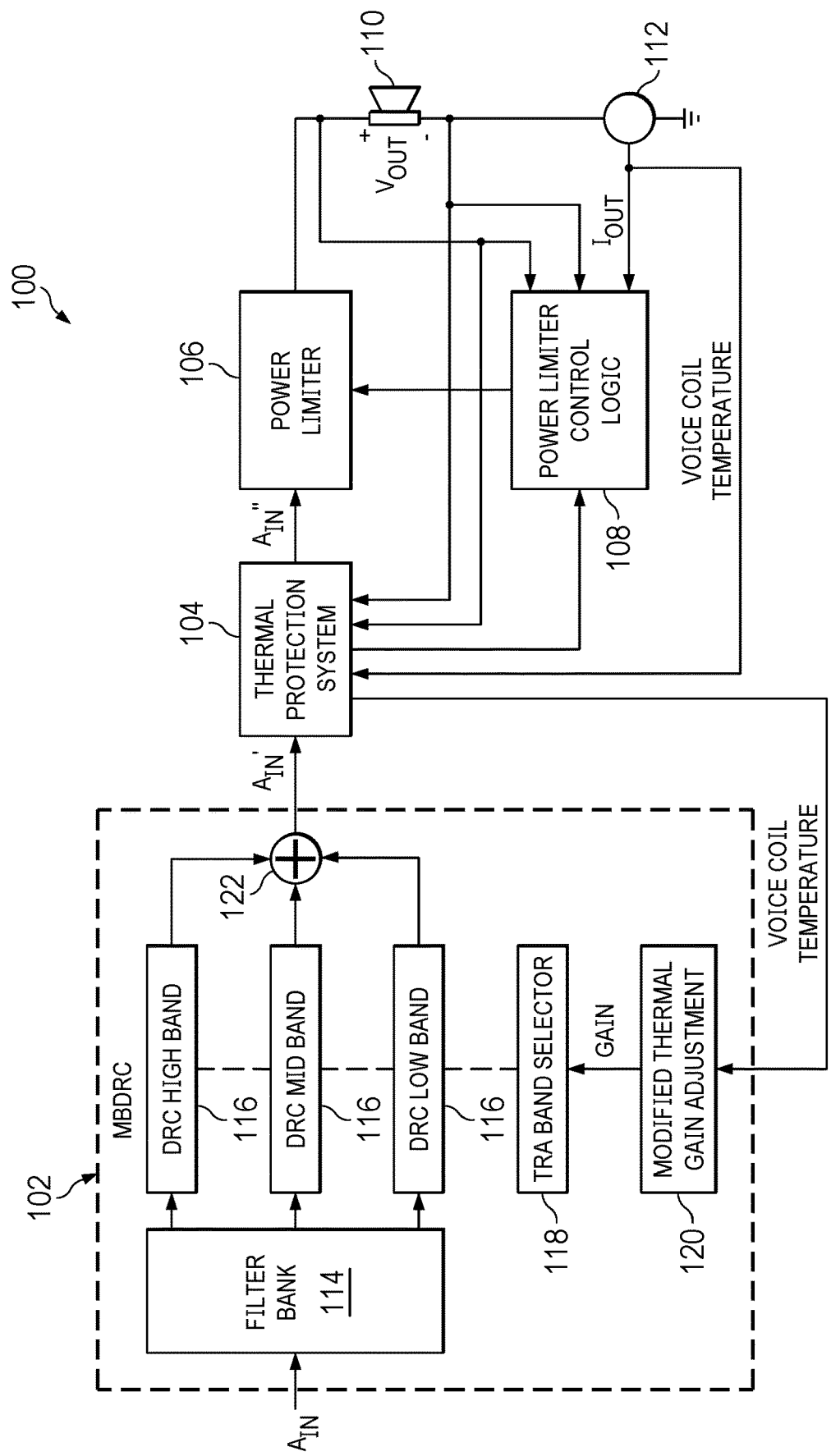
FIG. 1 illustrates an example audio system, in accordance with embodiments of the present disclosure.

FIG. 1 illustrates an example audio system 100, in accordance with embodiments of the present disclosure. As shown in FIG. 1, audio system 100 may include a thermal-controlled multi-band dynamic range compressor (MBDRC) 102, a thermal protection system 104, a power limiter 106, power limiter control logic 108, a speaker 110, and a current sensor 112.

As shown in FIG. 1, MBDRC 102 may receive an input audio signal $A_{IN}$ (which may comprise a digital signal), separate audio signal $A_{IN}$ into a plurality of bands, and selectively apply a modified thermal gain adjustment to one or more of such bands, and recombine the bands (as modified), for further processing by thermal protection system 104 and power limiter 106 before being driven to speaker 110. Accordingly, MBDRC 102 may include a filter bank 114 configured to filter input audio signal $A_{IN}$ into a plurality of bands. For example, in the embodiments represented by FIG. 1, filter bank 114 may separate input audio signal $A_{IN}$ into a low-frequency band, a mid-frequency band, and a high-frequency band. MBDRC 102 may also include a dynamic range compressor (DRC) 116 for each respective band, such that, when a particular frequency band is selected for temperature-based dynamic range compression by thermal rate adjustment (TRA) band selector 118, the DRC 116 associated with such frequency band may compress (e.g., attenuate) the content of input audio signal $A_{IN}$ within such frequency band by a programmable temperature-based gain determined by modified thermal gain adjustment block 120. After temperature-based dynamic range compression (if any) is applied to the various bands, combiner 122 may recombine the bands into a modified input signal $A_{IN}'$.

Although DRCs 116 may be used for respective bands of input audio signal $A_{IN}$, it is understood that in some embodiments of the present disclosure, DRCs 116 may not be present, but TRA band selector 118 and thermal gain adjustment block 120 may still be capable of (e.g., in concert with other components not explicitly shown) performing functionality similar or identical to that described herein.

Figure 2:
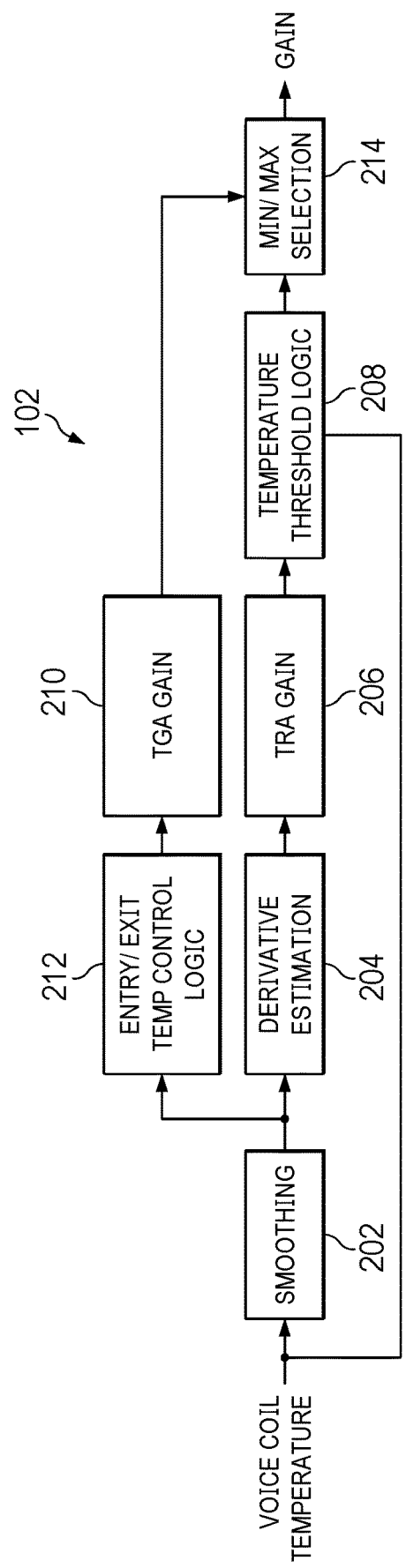
FIG. 2 illustrates an example modified thermal gain adjustment block in accordance with embodiments of the present disclosure.

Turning briefly to FIG. 2, example functionality of modified thermal gain adjustment block 120 is described. As shown in FIG. 2, modified thermal gain adjustment block 120 may receive a signal indicative of a voice coil temperature of or proximate to a voice coil of speaker 110. For example, such voice coil temperature may be estimated by thermal protection system 104 based on a monitored output voltage $V_{OUT}$ and output current $I_{OUT}$ of speaker 110 (as sensed by current sensor 112), as described in greater detail below. As another example, such voice coil temperature may be derived from a temperature sensor (e.g., a thermistor), which may be the case in embodiments of audio system 100 not having a thermal protection system.

As shown in FIG. 2, a smoothing filter 202 may low-pass filter voice coil temperature readings before being processed by two different gain paths. In a first path, a derivative estimation block 204 may calculate a mathematical derivative of (e.g., the time rate of change of) the smoothed voice coil temperature. Based on the mathematical derivative of the smoothed voice coil temperature, thermal rate adjustment (TRA) gain block 206 may determine a first gain (e.g., attenuation), which may in some embodiments be a linear gain, that may be applied to a band of input audio signal $A_{IN}$. For example, such attenuation may increase as the mathematical derivative of the smoothed voice coil temperature increases and may decrease as the mathematical derivative of the smoothed voice coil temperature decreases. Thus, more attenuation may be applied when the voice coil temperature is quickly rising. However, because a high level of thermal change may happen when the voice coil temperature is at a low, non-dangerous level, temperature threshold logic 208 may pass the gain calculated by TRA gain block 206 if the voice coil temperature is above a threshold temperature, and may otherwise output a unity gain (e.g., apply no attenuation) when the voice coil temperature is below the threshold temperature.

When the voice coil temperature is in steady-state, the first gain generated by the first path may be ineffective to provide a desired reshaping of the thermal response of speaker 110, so as to avoid excessive thermal attenuation response of thermal protection system 104 and/or power limiter 106. Accordingly, in the second path of modified thermal gain adjustment block 120, thermal gain adjustment (TGA) gain block 210 may determine a second gain (e.g., attenuation), which may in some embodiments be a linear gain, that may be applied to a band of input audio signal $A_{IN}$ based on the smoothed voice coil temperature generated by smoothing filter 202. Such second path may also include a temperature threshold entry/exit mechanism 212 (e.g., hysteresis) such that TGA gain block 210 may be enabled and disabled based on a lower temperature threshold and higher temperature threshold to avoid frequent decision fluctuation. Accordingly, when TGA gain block 210 is disabled, it may output a unity gain (e.g., no attenuation). A minimum/maximum selector 214 may select the minimum of the first gain (from the first path) and the second gain (from the second path) (i.e., select the maximum attenuation).

Turning back to FIG. 1, TRA band selector 118 may select a band for attenuation (which may be the low-frequency band for most audio applications) and apply the gain calculated by modified thermal gain adjustment block 120 to the DRC 116 for such band. In some embodiments, TRA band selector 118 may select the band for attenuation based on characterization of a temperature response and/or amplitude response of the speaker 110 as a function of frequency across a plurality of frequency bands. For example, because audio micro-speakers often have lower efficiency at lower (e.g., bass) frequencies, in some embodiments, TRA band selector 118 may generally select lower-frequency bands for attenuation.

Figure 3:
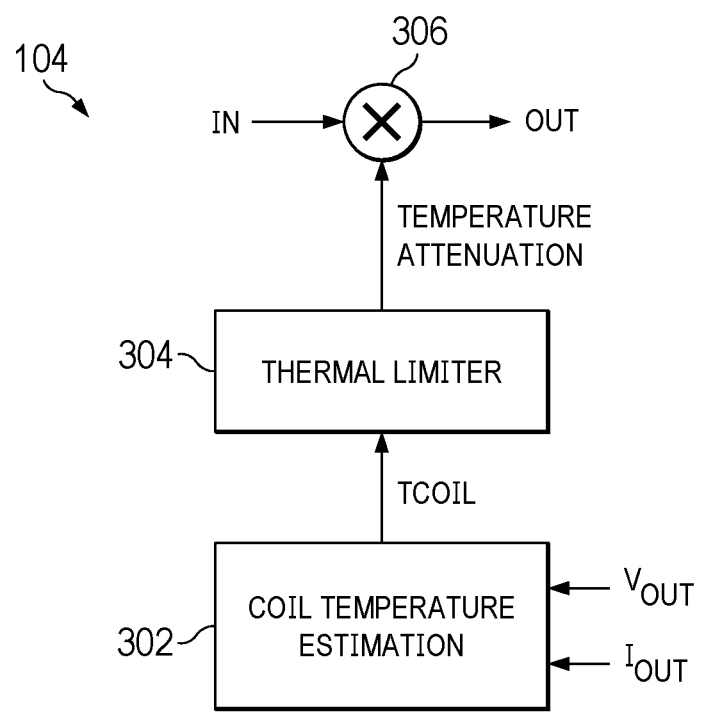
FIG. 3 illustrates an example thermal protection system in accordance with embodiments of the present disclosure.

Thermal protection system 104 may include any system, device, or apparatus configured to attenuate the full band of an audio signal based on a measured or estimated voice coil temperature of speaker 110, in order to protect speaker 110 from thermal damage. For example, in some embodiments, thermal protection system 104 may be implemented using systems and methods identical to or similar to that described in U.S. Pat. No. 10,356,522, which is incorporated by reference herein in its entirety. FIG. 3 illustrates an example thermal protection system 104 in accordance with embodiments of the present disclosure. As shown in FIG. 3, a coil temperature estimator 302 may receive signals indicative of output voltage $V_{OUT}$ across speaker 110 and output current $I_{OUT}$ through speaker 110 and based thereon, estimate a voice coil temperature of speaker 110. Based on such temperature and/or a rate of change of such temperature, a thermal limiter 304 may determine a temperature attenuation which may be applied to an input signal of thermal protection system 104 by a gain element 306 (e.g., an amplifier) to generate an output signal. Accordingly, turning again briefly to FIG. 1, thermal protection system 104 may receive modified input signal $A_{IN}'$ and apply a temperature based attenuation to the full band of modified input signal $A_{IN}''$ to generate temperature-attenuated signal $A_{IN}''$.

Although audio system 100 is shown as including thermal protection system 104, it is noted that in some embodiments, thermal protection system 104 may not be present, in which case modified input signal $A_{IN}'$ may be passed directly to power limiter 106 or thermal protection system 104 may be replaced by a gain element (e.g., an amplifier) having unity gain.

Figure 4:
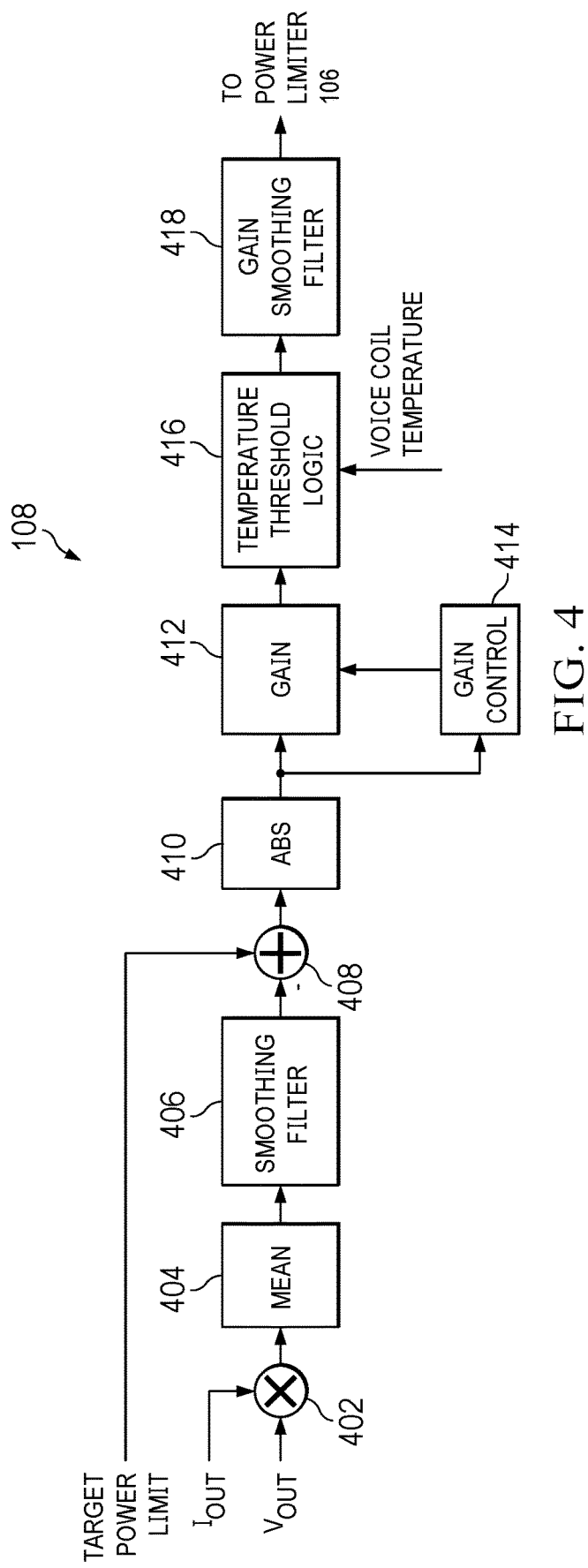
FIG. 4 illustrates example power limiter control logic, in accordance with embodiments of the present disclosure.

Power limiter 106 may comprise any suitable system, device, or apparatus (e.g., an amplifier) configured to apply an attenuation based on a level of power consumed by speaker 110 in order to maintain power consumption of speaker 110 at or below a target power limit, even after gain adjustments applied by MBDRC 102 and/or thermal protection system 104. Power limiter control logic 108 may calculate such gain based on a calculated power consumption by speaker 110 and the target power limit. FIG. 4 illustrates an example power limiter control logic 108, in accordance with embodiments of the present disclosure.

As shown in FIG. 4, a multiplier 402 may multiply output voltage $V_{OUT}$ and output current $I_{OUT}$ to determine a power consumption of speaker 110. A mean calculation block 404 may calculate an average of a pre-defined number of trailing samples of the calculated power (e.g., via an accumulate and divide operation) to generate an average power consumption, and a smoothing filter 406 may low-pass such average power consumption to smooth the calculation of the average power. A combiner 408 may subtract the smoothed average power from the target power limit to generate an error signal ERROR, and an absolute value block 410 may calculate the absolute value of such error.

A gain update block 412 may calculate a gain based on the error signal. Under the control of gain control block 414, such calculated gain may be updated when the error signal is above a threshold value, such updated gain equal to the previous value of the sample minus the product of a multiplicative step factor μ and the error signal (e.g., Gain=Gain−μ·ERROR). In some embodiments, such step factor μ may also be based on the error. For example, in some embodiments, a smaller value of step factor μ may be used above the threshold value of the error but below a second threshold value greater than the threshold value, and a larger value of step factor μ may be used for error signals above the second threshold value.

Temperature threshold control logic 416 may pass the gain generated by gain block 412 if the voice coil temperature is above a threshold temperature, and may otherwise output a unity gain (e.g., apply no attenuation) when the voice coil temperature is below the threshold temperature. Although not shown explicitly in FIG. 4, in some embodiments, temperature threshold control logic 416 may employ multiple thresholds, in order to implement a hysteresis to prevent frequent decision fluctuation between passing the gain generated by gain block 412 and the unity gain.

A gain smoothing filter 418 may low-pass filter the gain value generated by temperature threshold control logic 416, the resulting smoothed gain communicated to power limiter 106 to be applied to temperature-attenuated signal $A_{IN}''$ in order to generate output voltage $V_{OUT}$.

Although audio system 100 is shown as including power limiter 106, it is noted that in some embodiments, power limiter 106 may not be present, in which case modified input signal $A_{IN}'$ or temperature-attenuated signal $A_{IN}''$ may be passed directly to speaker 110 or power limiter 106 may be replaced by a gain element (e.g., an amplifier) having unity gain.

In accordance with the methods and systems described above, MBDRC 102 may adaptively remove certain frequency components (e.g., bass frequencies) of an audio signal based upon a temperature or rate of change of temperature of the voice coil of speaker 110. Such adaptive removal of certain frequency components may minimize heating of speaker 110, while also minimizing full band attenuation that may occur using thermal protection system 104 and/or power limiter 106. As a result, the sound pressure level and dynamics of speaker 110 may be improved over existing techniques, and undesirable effects of existing techniques, such as thermal pumping, may be reduced or eliminated. In addition or alternatively, the systems and methods described herein may enable speaker 110 to maintain an equivalent loudness in some cases while consuming less power, as compared to existing approaches, as these systems and methods may increase overall acoustic efficiency of speaker 110 by optimizing the voltage signal driven to speaker 110.

Although the foregoing contemplates use of MBDRC 102 in connection with an audio system for playback of an audio signal to an audio speaker, it is understood that the systems and methods described herein may also be applied to any other suitable speaker, including, without limitation, a linear resonant actuator or other haptic actuator.

Further, although FIG. 1 depicts speaker 110 being driven in a single-ended configuration and depicts current sensor 112 in a single-ended configuration for the purposes of clarity and exposition, it is understood that the systems and methods described herein may be applied to a speaker driven in a differential output configuration and/or a current sensor in a differential configuration.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
a first input configured to receive a playback signal to be played back to a transducer;
a second input configured to receive temperature information associated with the transducer, wherein the temperature information comprises a temperature associated with the transducer and a rate of change of the temperature associated with the transducer, and wherein the temperature and the rate of change are based on a monitored output voltage of the transducer and a monitored output current of the transducer;
a thermal-controlled gain element configured to:
determine a sub-band gain to be applied to a selected frequency band of the playback signal, wherein the thermal-controlled gain element determines the gain based on the temperature information; and
apply the sub-band gain to the selected frequency band to generate a first intermediate signal;
a thermal protection system configured to apply a first full-band gain, in series with the sub-band gain, to the first intermediate signal based on a temperature associated with the transducer, to generate a second intermediate signal; and
a power limiter configured to apply a full-band gain, in series with the sub-band gain and the first full-band gain, to the second intermediate signal based on a power consumption associated with the transducer, wherein application of the full-band gain is conditioned on the temperature exceeding a threshold temperature, to generate an output signal.

2. The system of claim 1, wherein the thermal-controlled gain element decreases the sub-band gain in response to an increase of the temperature.

3. The system of claim 1, wherein the selected frequency band is a frequency range of the transducer having a lower efficiency at the selected frequency band compared to other frequency ranges of the transducer.

4. The system of claim 1, wherein the power limiter is controlled with an adaptive control loop based on a difference between the power consumption and a target power consumption for the transducer.

5. The system of claim 1, wherein the thermal-controlled gain element is further configured to:
divide the playback signal into a plurality of different frequency bands; and
apply different gains to each of the different frequency bands.

6. The system of claim 5, wherein each of the different gains is based on the temperature information.

7. The system of claim 1, wherein the thermal-controlled gain element is further configured to apply the sub-band gain only when a temperature associated with the transducer is above a threshold temperature.

8. A method comprising:
determining, based on temperature information associated with a transducer, a sub-band gain to be applied to a selected frequency band of a playback signal to be played back to the transducer, wherein the temperature information comprises a temperature associated with the transducer and a rate of change of the temperature associated with the transducer, and wherein the temperature and the rate of change are based on a monitored output voltage of the transducer and a monitored output current of the transducer;
applying the sub-band gain to the selected frequency band to generate a first intermediate signal;
applying a first full-band gain, in series with the sub-band gain, to the first intermediate signal based on a temperature associated with the transducer, to generate a second intermediate signal; and
applying a full-band gain by a power limiter, in addition to series with the sub-band gain and the first full-band gain, to the playback second intermediate signal based on a power consumption associated with the transducer, wherein application of the full-band gain is conditioned on the temperature exceeding a threshold temperature, to generate an output signal.

9. The method of claim 8, further comprising decreasing the sub-band gain in response to an increase of the temperature.

10. The method of claim 8, wherein the selected frequency band is a frequency range of the transducer having a lower efficiency at the selected frequency band compared to other frequency ranges of the transducer.

11. The method of claim 8, further comprising controlling the power limiter with an adaptive control loop based on a difference between the power consumption and a target power consumption for the transducer.

12. The method of claim 8, further comprising:
dividing the playback signal into a plurality of different frequency bands; and
applying different gains to each of the different frequency bands.

13. The method of claim 12, wherein each of the different gains is based on the temperature information.

14. The method of claim 8, further comprising applying the sub-band gain only when a temperature associated with the transducer is above a threshold temperature.

\* \* \* \* \*